Figure 1:
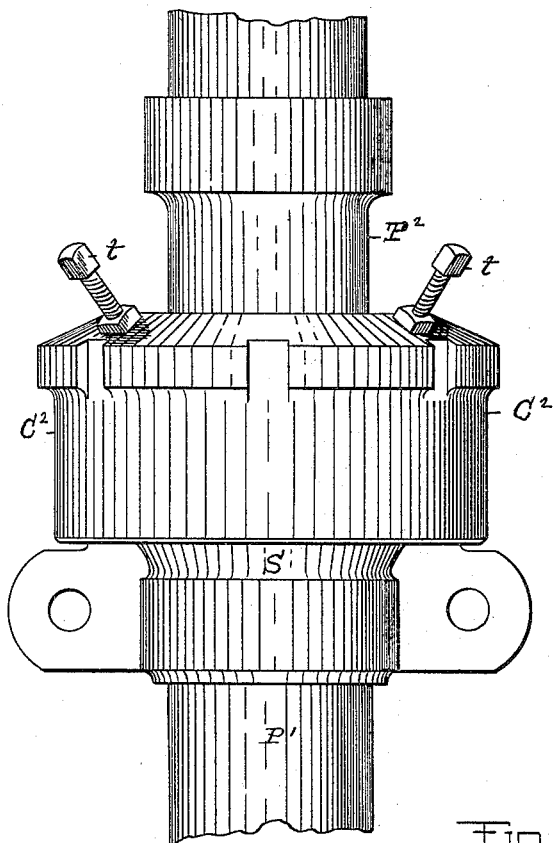

(No Model.) 2 Sheets—Sheet 1.

T. CURLEY.
BALL AND SOCKET JOINT FOR STEAM PIPE CONNECTIONS.

No. 409,277. Patented Aug. 20, 1889.

WITNESSES
William A. Swert
Charles S. Buintnal

INVENTOR
Thomas Curley
by W E Hagan atty (No Model.) 2 Sheets—Sheet 2.

T. CURLEY.
BALL AND SOCKET JOINT FOR STEAM PIPE CONNECTIONS.

No. 409,277. Patented Aug. 20, 1889.

WITNESSES
William A. Sweet
Charles S. Brimhall

INVENTOR
Thomas Curley
by W E Hagan atty

United States Patent Office.

THOMAS CURLEY, OF TROY, NEW YORK, ASSIGNOR OF ONE-HALF TO WILLIAM BAILEY, OF SAME PLACE.

BALL-AND-SOCKET JOINT FOR STEAM-PIPE CONNECTIONS.

SPECIFICATION forming part of Letters Patent No. 409,277, dated August 20, 1889.

Application filed May 1, 1889. Serial No. 309,158. (No model.)

*To all whom it may concern:*

Be it known that I, THOMAS CURLEY, of the city of Troy, county of Rensselaer, and State of New York, have invented new and useful Improvements in Ball-and-Socket Joints for Steam-Pipe Connections, of which the following is a specification.

My invention relates to a method of constructing and arranging a ball-and-socket joint for steam-pipes such as are used to heat the cars of a railway-train, and which ball-and-socket joints are employed between the cars to adapt the steam-heating-pipe connections thereat to the movement of the cars when swaying from side to side, as well as when passing around curves.

My invention consists (as will be more fully detailed hereinafter in connection with its illustration) in the combination, with a pipe having a ball-form end and a passage through the latter, of a pipe-socket proper made with a central passage and connecting-pipe end, and having an annular concave seat interiorly encircling said passage for making thereat a steam-tight connection with the entering rounded ball-form end of said pipe; a cap constructed to make a threaded connection with the socket proper, said cap having a central passage for the pipe having the ball-form entering end, and an annular concave socket part interiorly encircling said passage that is adapted to make a steam-tight connection with the convexity of the ball-form end of the pipe where next adjacent to the latter and within the cap, and said cap being constructed with an annular recess encircling the concave socket part of the cap interior, a metal ring arranged in said recess, and ring-form packing between said ring and the socket proper, and set-screws in the cap adapted to engage with said ring and force it and the packing so that the latter will engage with the inner rim of the socket proper.

I am aware that a ball-and-socket pipe-connection has been made in which the ball-form entering end thereof made an engagement with an annular concavity that encircles the central passage of the socket part, but in which the ball-form entering end was held in place against the said socket-face by packing encircling the ball-form part back of its greatest diameter by the use of a split ring and a bearing-ring and the threaded connection between the cap and socket part, so that the ball-joint had only one metal bearing-face. By my improvement the ball-form end of the pipe is held between a metal socket-face formed in the cap and a metal socket-face formed in the socket proper, with an intermediate packing having a ring, the latter and the packing being forced to engage with the ball-form end of the pipe at its greatest diameter, and each side thereof by set-screws in a cap that are operated to engage with said ring.

The object of my improvement is to produce two metal connections—one in the socket proper and one in the cap—into which the ball-form part is ground, so that the latter will make a steam-tight engagement therewith when the parts are in place, with an intermediate packing that is forced to bear upon the ball-form end by a means that is independent of the threaded connection made between the cap and socket proper.

Accompanying this specification to form a part of it there are two plates of drawings containing four figures illustrating my invention, with the same designation of parts by letter reference used in all of them.

Figure 3:
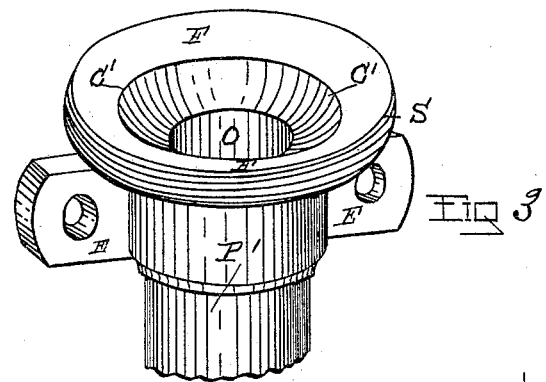
Figure 2:
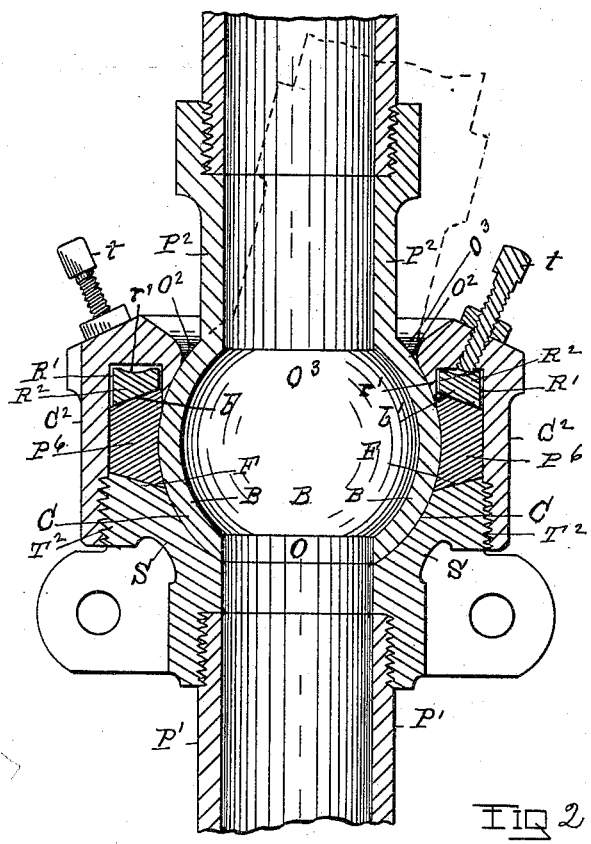
Figure 4:
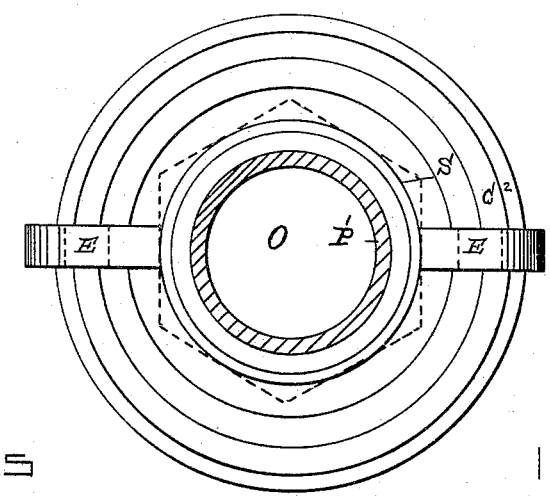

Of the illustrations, Figure 1 is a side elevation of a ball-and-socket joint for steam-pipes containing my invention. Fig. 2 is a central and vertical section of the same. Fig. 3 is a perspective of the socket part, and Fig. 4 is an end elevation with the socket end of the mechanism facing the view.

The several parts of the mechanism thus illustrated are designated by letter reference, and the function of the parts is described as follows:

The letter S designates the socket proper, which is made with the central passage O, connecting with the pipe P'.

The letter C designates an annular concavity that is formed on the socket part interior to encircle the passage O. This socket part is made with the beveled packing-face F, encircling the interior side face of the socket part in annular form and extending downwardly and inwardly from the side of the socket interior to the annular concavity C.

The letters E designate ears exteriorly and oppositely arranged on the socket proper and provided with belt-holes $h$ for hanging it beneath the car. This socket part is exteriorly threaded at $T'$.

The letter $C^2$ designates the cap, which at $T^2$ is threaded to connect with the socket S.

The letter $O^2$ designates a central opening made in the cap for the passage of the pipe $P^2$.

The letter $O^3$ designates an annular concavity made on the cap interior, so as to surround the opening $O^2$.

$R'$ indicates an annular recess made in the cap interior outside of the inwardly-projected annular concave $C^3$, and $R^2$ a packing-ring arranged within said recess $R'$. This ring is made with an annular recess $r'$ in its outer face and a downwardly and outwardly beveled inner face $b'$.

The letters $t$ designate set-screws that are threaded into the cap $C^2$, with their lower entering ends adapted as screws to engage with the ring $R^2$ within its annular recess $r'$.

The letter B designates the ball-form entering end of the pipe $P^2$, made with the passage $O^3$.

The letter $P^6$ designates packing that is placed between the interiorly-arranged annular beveled face F of the socket part and the beveled face $b'$ of the ring $R'$ when the parts are in position for use.

The parts thus constructed are connected as follows: The ball-form end B of the pipe $p^2$ is placed into the concavity C of the socket S, (the latter and the engaging convex face of the ball having been ground down to a facing contact,) the packing being placed so as to engage with the beveled face F of the socket. The ring is passed on over the pipe having the ball-form end, with its beveled surface $b'$ in contact with the packing. The cap $C^2$ is then screwed on by means of the threaded connection $T'$ $T^2$ made with the socket and the cap, being screwed down until its concavity $C^3$ is in contact with the ball-form end of the pipe $P^2$ back of its greater diameter, and so that the entering end thereof is in close contact with the annular concave face of the socket. After this has been done the set-screws $t$ are run in, so as to compactly press the packing around the ball between its metallic socket-seats in the socket proper and the cap. When the concave surfaces F of the socket proper and that of the cap (indicated at $b'$) become worn, then the cap is screwed onto the socket part to take up the slack and the set-screws $t$ are operated to pinch in the packing around the sides of the ball-form end of the pipe $P^2$.

While I prefer to use the ring $R'$ as arranged within an annular recess in the cap and operated by the set-screws $t$, if desired the socket and cap parts may be used without the ring $R'$ and the set-screws $t$, and the packing interiorly arranged between the cap and socket proper may, by the threaded connection between the cap and socket parts, be forced to embrace the ball-form entering end of the pipe $P^2$ and good results obtained.

As thus made and arranged, but few working parts are required to make the connection, and as the ball-form end of the pipe is held in place between two metal concave faces, so that it may rotate therein, instead of between one metal concave and a packing face, the contingencies of leakage are almost entirely avoided.

Having thus described my invention, what I claim, and desire to secure by Letters Patent, is—

1. In a ball-and-socket steam-pipe connection, the combination, with a socket proper having a central passage and an annularly and interiorly arranged concave made with a beveled edge and encircling said passage, of a cap constructed to make a threaded connection with said socket proper, said cap being made with a central passage and a concave encircling said passage, and a packing-ring recess encircling said concave, a metal packing-ring having a beveled inner face arranged in said recess, set-screws in said cap arranged to engage with said packing-ring, a pipe having a ball-form end adapted to make a rotating engagement with the concaves of the socket and cap, and a ring-form packing arranged between said ring and the bevel upon the interior of the socket proper, substantially in the manner as and for the purposes set forth.

2. The combination, with the pipe $P^2$, made with the ball-form end B, of the socket proper S, made with the central passage O, encircling concave C, beveled face F, and connecting-pipe $P'$, the cap $C^2$, constructed to make a threaded connection with said socket proper, and having the central passage $O^2$, encircling concave $O^3$, annular recess $R'$, and set-screws $t$, the ring R, made with the bevel $b'$, and the packing $P^6$, all constructed and arranged to operate substantially in the manner as and for the purposes set forth.

3. In a ball-and-socket steam-pipe connection, the combination, with a socket proper made with a central passage and an annular concave encircling the same, of a cap constructed to make a threaded connection with said socket proper, said cap having a central passage, an annular concave encircling said passage, and an annular packing-recess made therein, a pipe having a ball-form end adapted to make a rotating engagement with the annular concaves of said socket proper and cap, and a packing arranged within said packing-ring and between the interior annular edges of the socket proper and cap, substantially in the manner as and for the purposes set forth.

Signed at Troy, New York, this 6th day of April, 1889, and in the presence of the two witnesses whose names are hereto written.

THOMAS CURLEY.

Witnesses:
W. E. HOGAN,
CHARLES S. BRINTNALL.